(12) United States Patent
Bell

(10) Patent No.: US 6,213,262 B1
(45) Date of Patent: Apr. 10, 2001

(54) SHOCK ABSORBER

(75) Inventor: Stephen H. Bell, Guelph (CA)

(73) Assignee: Gabriel Ride Control Products, Inc., Brentwood, TN (US)

( * ) Notice: Subject to any disclaimer, the term of this patent is extended or adjusted under 35 U.S.C. 154(b) by 0 days.

(21) Appl. No.: 09/241,217

(22) Filed: Feb. 1, 1999

(51) Int. Cl.$^7$ ....................................................... F16F 9/34
(52) U.S. Cl. ................................................................. 188/315
(58) Field of Search ............................. 188/266.5, 282.4, 188/299.1, 315, 322.14

(56) References Cited

U.S. PATENT DOCUMENTS

| | | | |
|---|---|---|---|
| 4,310,077 | * | 1/1982 | Whiteside ............................. 188/282 |
| 4,846,317 | * | 7/1989 | Hudgens ............................ 188/299.1 |
| 4,949,989 | * | 8/1990 | Kakizaki et al. .................. 188/282.4 |
| 4,971,180 | * | 11/1990 | Kobayashi et al. .................. 188/315 |
| 4,973,854 | * | 11/1990 | Hummel ............................. 267/64.26 |
| 5,113,980 | * | 5/1992 | Furrer et al. .......................... 188/299 |
| 5,205,385 | * | 4/1993 | Ashiba ............................... 188/282.4 |
| 5,277,283 | * | 1/1994 | Yamaoka et al. ................. 188/282.5 |
| 5,386,893 | * | 2/1995 | Feigel ................................ 188/322.14 |
| 5,464,079 | * | 11/1995 | Lohberg et al. ....................... 188/315 |
| 6,003,644 | * | 12/1999 | Tanaka ................................ 188/266.5 |

FOREIGN PATENT DOCUMENTS

0179315 * 9/1985 (JP) ................................ 188/322.14

* cited by examiner

Primary Examiner—Christopher P. Schwartz
(74) Attorney, Agent, or Firm—McAndrews, Held & Malloy

(57) ABSTRACT

The present invention provides an improved method and apparatus for controlling and making real-time adjustments to damping in a shock absorber based on driving conditions and desired driving characteristics. The shock absorber has a reservoir compartment and a fluid-filled internal chamber divided into a compression compartment and a rebound compartment by a movable piston. A piston rod is connected to the piston and extends through a seal in the rebound end of the internal chamber. The shock absorber contains flow passages connecting, and normally allowing fluid to flow between, the reservoir compartment, the compression compartment and the rebound compartment. Fluid flow in the flow passages, which is directly related to the relative motion between the shock main body and the piston rod assembly, is controlled by providing a variable valve closing force. Control of the valve closing force, and thus the damping of the shock absorber, may be controlled in real-time either by the vehicle operator or an autonomous damping, control system.

6 Claims, 2 Drawing Sheets

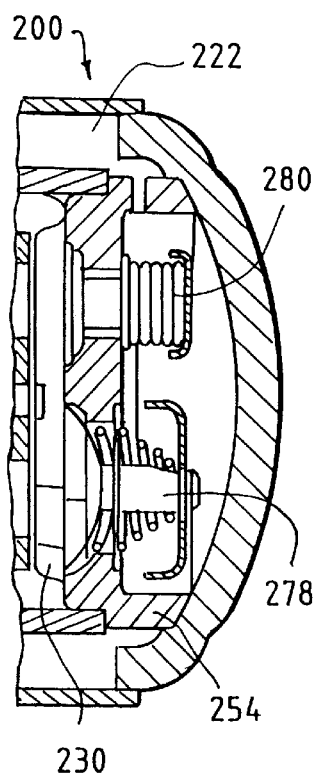
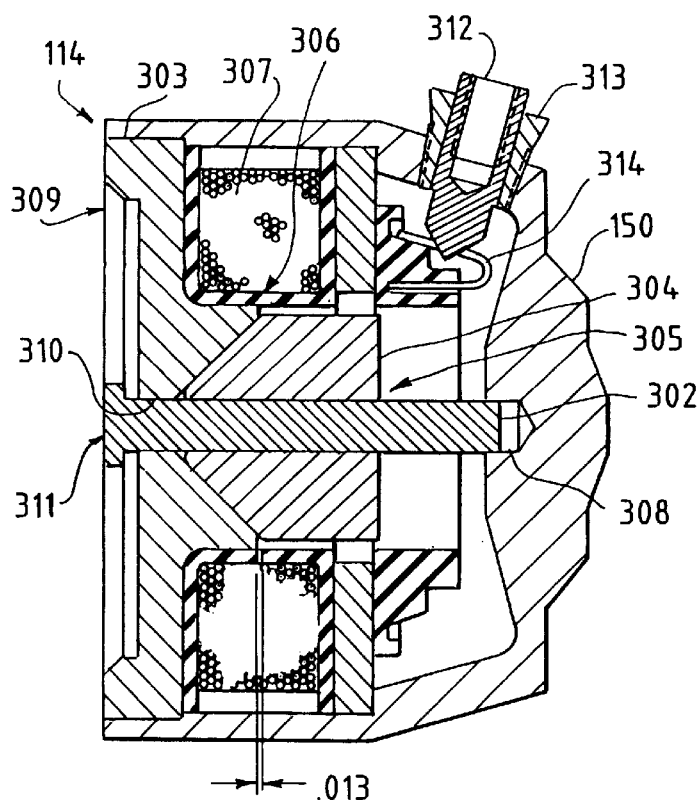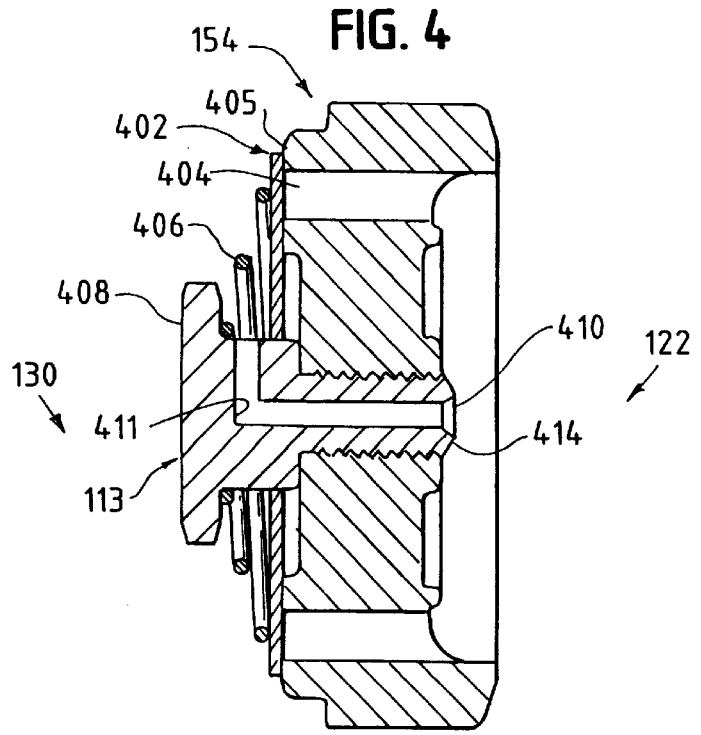

SHOCK ABSORBER

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

1. Field of the Invention

The present invention relates to hydraulic shock absorbers. More specifically, the present invention relates to a method and apparatus for increasing the performance of hydraulic shock absorbers by providing adjustable damping through the regulation of fluid flow within the shock absorber.

2. Description of the Related Art

Shock absorbers are commonly used in vehicle suspension systems to absorb unwanted vibrations, which occur during driving. Specifically, shock absorbers are generally connected between the body (sprung mass) and the suspension (unsprung mass) of the vehicle to "dampen" vibrations transmitted from the suspension to the body.

Vehicle shock absorbers usually have a hollow cylinder defining an internal chamber, which is divided into a compression compartment and a rebound compartment by a piston assembly slidably positioned in the internal chamber. The shock absorber includes internal valving which permits fluid to flow between the compression and rebound compartments as the piston moves within the internal chamber. One end of the cylinder is closed and is typically connected to the vehicle suspension by a suitable linkage. A piston rod extends through a seal assembly mounted in the other end of the cylinder and has its inner end connected to the piston and its outer end connected to the vehicle body by a suitable connector.

The piston assembly limits the flow of damping fluid within the internal chamber of the shock absorber during compression and extension of the shock, thereby providing a damping force, which "smooths" or "dampens" vibrations transmitted from the suspension to the body. The damping characteristics of a shock absorber are determined by the fluid pressure differential across the piston required to drive the fluid between the compression, rebound and reservoir compartments. This pressure differential and resulting flow rate, in turn, controls the speed at which the piston may move in the cylinder responsive to the external forces applied to the shock absorber. The greater the degree to which the flow of damping fluid is restricted by the piston assembly, the greater the damping forces which are provided by the shock absorber. Accordingly, a "soft" compression and rebound stroke is produced when the flow of damping fluid in the working internal chamber is relatively unrestricted. By contrast, a "firm" compression and rebound stroke is produced when there is an increased restriction in the flow of damping fluid in the working internal chamber.

Different driving characteristics, such as ride comfort, vehicle handling, and road holding ability depend on the amount of damping force provided by the vehicle's shock absorbers. The amount of damping force required to meet a particular set of driving characteristics is, in turn, dependent on driving surface conditions and the manner in which a vehicle is being driven. Because driving conditions and desired characteristics may change often, even within the course of a single journey, the amount of damping force required to meet the desired driving characteristics may also change often. There exists a need in the art for a shock absorber damping system which provides for real-time shock absorption modifications in response to changing driving conditions or changes in desired driving characteristics.

SUMMARY OF THE INVENTION

Accordingly, it is an object of the present invention to provide a method and apparatus for providing real-time adjustable shock absorber damping.

It is another object of the present invention to provide a method and apparatus for adjusting shock absorption damping through the use of devices regulating fluid flow between the internal chambers of a shock absorber.

It is a further object of the present invention to provide a method and apparatus for providing real-time adjustable shock absorption damping through the use of an electromechanical device applying variable valve closure force to regulate fluid flow between the internal chambers of a shock absorber.

One or more of the foregoing objects is met in whole or in part by a preferred embodiment of the present invention that provides a method and apparatus for improved shock absorption through real-time adjustable damping. The shock absorber has a reservoir compartment and a fluid-filled internal chamber divided into a compression compartment and a rebound compartment by a movable piston. A piston rod is connected to the piston and extends through a seal in the rebound end of the internal chamber. The shock absorber contains flow passages connecting and allowing fluid to flow between the reservoir compartment, the compression compartment and the rebound compartment. Fluid flow in the flow passages, which is directly related to the relative motion between the shock main body and the piston rod, is controlled in a real-time adjustable manner. An electromechanical device is used to apply variable valve closure force in one or more flow passages, thereby regulating fluid flow between the internal compartments of the shock absorber. The valve closure force applied by the electromechanical device may be controlled directly by a vehicle operator or optionally by an autonomous shock absorption control system.

Through the use of the present invention, shock absorption damping may be adjusted in real-time in response to changing driving conditions or changes in desired driving characteristics. The advantages of real-time adjustable damping include increased safety and rider comfort. These and other advantages of the present invention will become apparent to those skilled in the art upon reading and understanding the following detailed description with reference to the accompanying figures.

BRIEF DESCRIPTION OF THE DRAWINGS

FIG. 2 is a cross-sectional view of a typical compression head assembly.

FIG. 3 is a cross-sectional view of a damping control mechanism according to a preferred embodiment of the present invention.

FIG. 4 is a cross-sectional view of a compression head assembly according to a preferred embodiment of the present invention.

DETAILED DESCRIPTION OF THE PREFERRED EMBODIMENT

Figure 1:
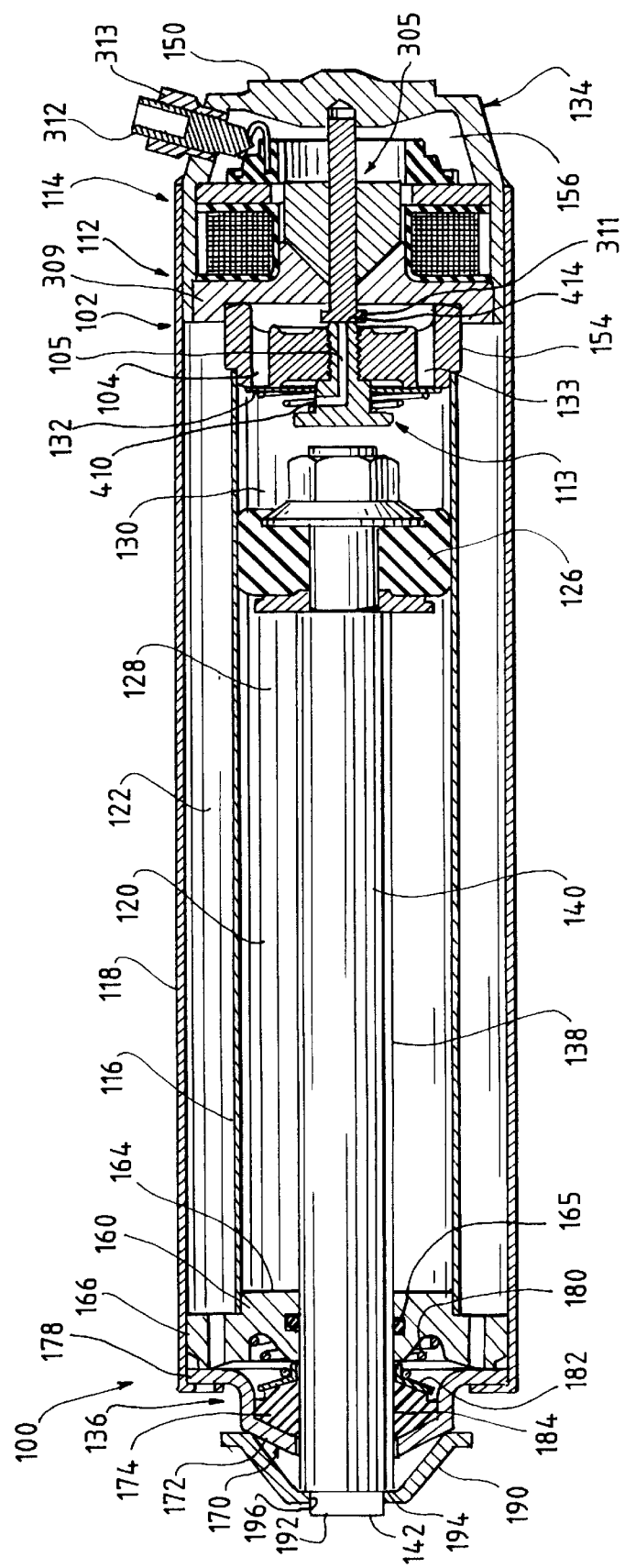
FIG. 1 is a cross-sectional view of a shock absorber with adjustable damping according to a preferred embodiment of the present invention.

In the following detailed description, spatially orienting terms are used, such as "upper," "lower," "left," "right," "vertical," "horizontal," and the like. It is to be understood that these terms are used for convenience of description of the preferred embodiments by reference to the drawings. These terms do not necessarily describe the absolute location in space, such as left, right, upward, downward, etc., that any part must assume.

FIG. 1 illustrates a shock absorber 100 incorporating a mechanism 102 for controllably damping the compression motion of the shock absorber 100. The mechanism 102 is shown in conjunction with a shock absorber 100 similar to those described in U.S. Pat. Nos. 4,310,077 and 5,234,084, the disclosures of which are hereby incorporated by reference.

The shock absorber 100 includes inner and outer cylinders 116, 118 extending coaxially with each other. The inner cylinder 116 defines an internal chamber 120, and the space between the inner and outer cylinders 116, 118 defines a reservoir compartment 122. A piston 126, slidably mounted within the internal chamber 120, divides the internal chamber 120 into a rebound compartment 128 and a compression compartment 130, the volumes of which vary in accordance with the position of the piston 126.

The ends of the cylinders 116, 118 adjacent the compression compartment 130 are closed by a first closure assembly 134, whereas the ends adjacent the rebound compartment 128 are closed by a second closure assembly 136. A piston rod 138 has an inner end 140 affixed to the piston 126 and an outer end 142 slidably and sealably projecting through the second closure assembly 136. As such, the end of the shock absorber adjacent the rebound compartment 128 is sometimes referred to as the open end or rod end, whereas the end adjacent the compression compartment 130 is commonly referred to as the closed end.

The shock absorber 101 is adapted to be connected between two masses or members. For this purpose, a connector, such as an eye connector, is typically secured to the central exterior of the first closure assembly 134. Similarly, the outer end 142 of the piston rod 138 is typically threaded to permit it to be secured to a mounting aperture, for example, by a reciprocal nut. Alternatively, the outer end 142 of the piston rod 138 could include an eye connector.

The shock absorber 100 is filled with fluid, such as hydraulic oil, pressurized air and/or a combination of both. As is explained below, the shock absorber 100 includes a fluid control system for permitting controlled fluid flow between the compression and rebound compartments 128, 130 as the piston 126 moves within the internal chamber 120, thereby providing the desired damping force.

The first closure assembly 134 includes an outer closure member 150 which is fixedly connected to the end of the outer cylinder 118 to seal the end of the outer cylinder 118. The first closure assembly 134 further includes a base member 154 which is fixedly connected with the end of the inner cylinder 116 and extends into the interior volume of the outer closure member 150. The periphery of the base member 154 provides passages between the reservoir compartment 122 and the space between the base member 154 and the stator subassembly 309.

The second closure assembly 136 includes an inner head 160 which closes the other end of the inner cylinder 116. The inner head 160 has a reduced diameter lower portion 164 which is press fit into the inner cylinder 116 and a central aperture sized to slidably engage about the piston rod 138. A seal 165 disposed within the central aperture seals about the outer surface of the piston rod 138. The inner head 160 further includes an increased diameter upper flange 166, which extends radially towards the outer cylinder 118.

The second closure assembly 136 further includes a seal assembly 170 comprising a metallic outer cap 172 and an elastomeric seal member 174, both of which include a respective center aperture sized to slidably engage about the piston rod 138. The outer cap 172 includes a lower leg 178, which is fixedly jointed to the outer cylinder 118 to secure the seal assembly 170 in the rod end of the shock absorber 100. A spring 180 is positioned between the inner head 160 and the seal member 174 to bias the seal member 174 against the inner face of the outer cap 172. A spring seat 182 may be positioned between the spring 180 and the seal member 174 to prevent degradation of the seal member 174 by the spring 180. The center aperture of the seal member 174 includes a plurality of lips or ridges 184 which scrape against the outer diameter of the piston rod 138 to remove excess shock absorber fluid from the rod as it moves out of the internal chamber 120.

The shock absorber 100 is equipped with a retainer 190, which retains an upper coil over the spring seat. The retainer 190 is fixedly connected at its upper end to the piston rod 138 for movement therewith. For this purpose, the outer end 142 of the piston rod 138 includes a reduced diameter portion 192 defining a shoulder 194. The retainer 190 has a center bore 196 sized to fit around the reduced diameter portion 192 of the piston rod 138. The retainer 190 may be secured against the shoulder 194 by a hex nut which threads onto the reduced diameter portion 192 above the retainer 190. Alternately, the retainer 190 can be welded to the shoulder 194.

As was mentioned above, the shock absorber 100 includes a flow control system for providing controlled fluid flow between the rebound and compression compartments 128, 130 as the piston 126 moves within the internal chamber 120. The flow control system preferably includes by-pass for permitting controlled by-pass fluid flow through the piston 126 from the rebound compartment 128 to the compression compartment 130 during the rebound stroke and from the compression compartment 130 to the rebound compartment 128 during the compression stroke. The preferred embodiment illustrated in FIG. 1 incorporates a disc-valved piston 126 common to the industry. The rebound by-pass means typically includes at least one rebound flow passage extending through the piston 126 between the rebound and compression compartments 128, 130. Likewise, the compression by-pass means typically includes at least one compression flow passage extending through the piston 126 between the compression and rebound compartments 130, 128. Each flow passage is valved and governs fluid flow between the rebound and compression compartments during rebound and compression strokes.

The shock absorber flow control system typically includes a replenishing valve and a compression valve to control the flow of fluid between the compression compartment and the reservoir compartment. FIG. 2 illustrates a typical compression head assembly 200 incorporating typical flow control apparatus for regulating the flow of fluid between the compression compartment 230 and the reservoir compartment 222. A replenishing valve 278 and a compression valve 280 are positioned in the base member 254 and are interposed between the compression compartment 230 and the reservoir compartment 222. Both valves 278, 280 operate as spring biased check valves, and both valves 278, 280 communicate with the compression compartment 230 on their top side and with the reservoir compartment 222 on their lower side.

During a compression stroke, increasing pressure in the compression compartment 230 biases the replenishing valve 278 closed and the compression valve 280 open, thereby allowing fluid to flow from the compression compartment 230 into the reservoir compartment 222 through the compression valve 280. Conversely, during a rebound stroke, decreasing, pressure in the compression compartment 230 biases the compression valve 280 closed and the replenishing valve 278 open, thereby allowing fluid to flow from the reservoir compartment 222 into the compression compartment 230 to replenish the volume vacated by the piston rod as it extends or moves out of the internal chamber of the shock absorber. Simultaneously, and referring to FIG. 1, increasing pressure in the rebound compartment 128 is transmitted through passages in the disc-valved piston 126 to valve discs in the disc-valved piston 126 which are unseated at a predetermined pressure, permitting fluid to flow between the rebound compartment 128 and the compression compartment 130.

It will be understood that the construction of the shock absorber as thus far described is similar to the shock absorbers described in the aforementioned patents. It will also be understood that the components thus far described may assume other configurations without departing from the scope of the present invention.

Referring to FIG. 1, apparatus according to a preferred embodiment of the present invention includes a solenoid mechanism 112 for controllably damping the movement of the piston rod 138 with respect to the internal chamber 120. The solenoid mechanism 112 comprises a compression valve plunger assembly 114 and a compression valve seat assembly 113. The solenoid mechanism 112, as illustrated in FIG. 1, is incorporated for the control of compression damping, but may readily be applied for the control of rebound damping as well.

FIG. 3 contains a cross-sectional view of the compression valve plunger assembly 114. A non-magnetizable stainless steel pushrod 302 is first pushed through a ferrous core 303 and then through a ferrous magnetizable plunger 304. The pushrod 302 is attached to the plunger 304 to form the plunger subassembly 305. A compression valve seat contact 311 is located on the upper end of the plunger subassembly 305. A bobbin subassembly 306 containing a conductive wire coil 307 fixedly attached to a ferrous core 303 to form the stator subassembly 309. The stator subassembly 309 preferably contains flux washers, which are added to the stator subassembly 309 to make the solenoid mechanism 112 more efficient. The longitudinal axes of the plunger subassembly 305 and the stator subassembly 309 are aligned, and the plunger subassembly 305 and stator subassembly 309 are sized such that the plunger subassembly 305 fits longitudinally slidably within the inner radius of the bobbin subassembly 306. An end cap aperture 308 and a stator aperture 310 receive the axial ends of the plunger subassembly 305 and maintain the longitudinal alignment between the plunger subassembly 305 and the stator subassembly 309 while allowing relative motion between the plunger subassembly 305 and the stator subassembly 309 along their respective longitudinal axes.

When electrical current is driven through the coil 307, an electromagnetic field is formed. The electromagnetic field, in turn, asserts a physical closing force on the ferrous plunger 304 to draw the plunger subassembly 305 upward to the axial center of the stator assembly 309. The magnitude of the closing force is a function of the electrical current flowing through the coil 307, which may be readily controlled by a damping controller.

The electrical power provided to the coil 307 is preferably obtained from a vehicle alternator. The AC voltage from the alternator is rectified to a DC voltage, which is then controllably applied to the coil 307. A pair of electrical connectors 312 (only one shown) protrude from the end cap 150 and are provided for convenient connectivity with a source of electrical current. Each of the connectors 312 includes an annular plastic, externally threaded portion 313 so that the connectors can be threaded into the end cap 150 of the shock absorber 100. An O-ring seal, not shown, may be disposed between the connector 312 and its portion 313, and a conventional flanged sealing gasket, also not shown, may be disposed between the portion 3 13 and the end cap 150. Each of the connectors 312 conductively engage spring clip terminals 314 (only one shown), which are in turn conductively coupled to the coil 307. A damping controller controls the voltage applied to the coil 307. The damping controller may act to control either the voltage across the coil 307 or the current through the coil. Because of the temperature independent relationship between the coil 307 current and the closing force for the plunger assembly 305, a damping controller incorporating current control is preferred.

FIG. 4 contains a cross-sectional view of the compression head 154 including the compression valve seat assembly 113. A replenishing valve disc 402 is positioned to regulate the flow of fluid through the replenishing flow passage 404 and is normally biased downward with a spring 406 to a flow blocking position contacting the replenishing valve seat 405. The spring 406 is held in place by a retaining bolt 408. A compression flow passage 410 passes through the retaining bolt 408 and connects the compression compartment 130 to the reservoir compartment 122. The flow passage 410 preferably contains a right angle 411 to break up fluid flow and prevent the relatively heavy plunger assembly (305 in FIG. 3) from resonating at higher vehicle speeds. At the lower end of the retaining bolt 408 is a compression valve seat 414. The compression valve seat contact 311 of the plunger subassembly 305 is normally biased to a blocking position contacting the compression valve seat 414 with an electromagnetically induced closing force.

The flow of fluid from the compression compartment 130 to the reservoir compartment 122 is regulated by the interaction between the compression valve seat contact (311 in FIG. 3) and the compression valve seat 414. The longitudinal distance between the compression valve seat contact 311 and the compression valve seat 414 preferably ranges between 0 inches for complete flow blockage to 0.008 inches for full fluid flow.

FIG. 1 illustrates the spacial relationship between the compression valve plunger assembly 114 and the compression valve seat assembly 113. The longitudinal axes of the compression valve plunger assembly 114 and the compression valve seat assembly 113 are aligned so that the longitudinal motion of the plunger subassembly 305 relative to the stator 309 of the compression valve plunger assembly 114 increases and decreases the distance between the compression valve seat contact 311 and the compression valve seat 414. The closing force between the stator 309 and the plunger assembly 305 effectively provides an adjustable compression valve closing force which acts to inhibit the flow of fluid through the compression flow passage 410. During the compression stroke of the shock absorber 100, the fluid pressure in the compression compartment 130, and thus the flow passage 410, act on the face of the compression valve seat contact 311. Thus the fluid pressure in the compression compartment 130 creates an opening force on the plunger assembly 305 opposing the electromagnetically induced closing force applied to the plunger assembly 305. When the opening force exceeds the closing force, the compression valve seat contact 311 is unseated from the compression valve seat 414, which enables fluid to flow from the compression compartment 130 to the reservoir compartment 122.

When the present invention is incorporated into a vehicle shock absorption system, either manual or autonomous control of shock absorber damping is possible. A vehicle operator may manually add stiffness or compliance to the vehicle shock absorption system, or an autonomous control system may act in real-time to adjust shock absorption damping in response to detected changes in driving conditions. For example, acceleration or position sensors may be located at various places on the vehicle or shock absorbers to provide acceleration or position information to a damping controller, which in turn makes damping magnitude decisions and provides the appropriate electrical stimulus to the compression valve plunger assembly 114 coils 307. Vehicle speed information may also be collected and used to make damping decisions.

The present invention provides real-time shock absorption damping control, which in turn allows vehicle operators or autonomous control systems to make damping adjustments in response to changing driving conditions and/or changes in desired driving characteristics. An operator may choose to sacrifice ride comfort for handling in poor driving conditions resulting in safer travel. Similarly, a less comfortable, better handling ride may be chosen in an emergency situation. Conversely, in good driving conditions, an operator may chose a more comfortable ride resulting in a more relaxed driving environment and less mechanical stress on the vehicle.

As will be appreciated by those skilled in the art, a solenoid mechanism, like mechanism 112, could also be used with a monotube having a remote fluid reservoir. The mechanism could then be disposed in the reservoir, preferably near the reservoir entrance, or in the line connecting the reservoir with the monotube.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features, which come within the spirit and scope of the invention.

What is claimed is:

1. An improved shock absorber capable of real time, infinitely variable adjustable damping during compression, the shock absorber comprising:
   a reservoir compartment;
   a hollow cylinder defining an internal chamber and having a central longitudinal axis;
      a piston slidably mounted for reciprocal movement within the internal chamber along the central longitudinal axis, with the piston separating the internal chamber into a compression compartment and a rebound compartment, the volumes of which compartments vary in accordance with the position of the piston in the internal chamber, with the piston defining one axial end of the compression compartment;
   a first end closure closing the end of the internal chamber adjacent the compression compartment;
   a piston rod connected to the piston and extending from the end of the internal chamber adjacent the rebound compartment;
   a second end closure closing the end of the internal chamber adjacent the rebound compartment and slidably sealingly engaging about the piston rod;
   a fluid filling the internal chamber and at least partially filling the reservoir compartment;
   a compression head assembly in the internal chamber adjacent to the first end closure and defining the other axial end of the compression compartment, the compression head assembly including a first surface adjacent to the compression compartment, a second surface adjacent to the first end closure, a replenishing valve for controlling flow of fluid from the reservoir compartment to the compression compartment, and a compression flow passage, with the compression flow passage extending between the first surface and the second surface so as to permit flow from the compression compartment to the reservoir compartment and having an inlet end and an outlet end, with the inlet end of the compression flow passage being adjacent the first surface, and with the outlet end of the compression flow passage being adjacent the second surface of the compression head and defining a valve seat; and
   a valve assembly that is disposed between the second surface of the compression head and the first end closure and that includes a valve member and a solenoid coil subassembly and a valve member, operatably associated with the valve member, with the valve member being movable, with respect to the valve seat and in response to electrical current applied to the solenoid coil subassembly, between a first position, where the valve member is closely adjacent the valve seat so as to substantially prevent flow through the compression flow passage, a second position where the valve member is spaced a distance from the valve seat so as to permit substantially unrestricted flow through the compression flow passage and a variety of different positions between first and second positions depending on the electrical current applied to the solenoid coils subassembly; and with the inlet end of the compression flow passage being disposed at an angle, with respect to the central longitudinal axis, so as to avoid exciting resonance in the valve assembly, including the valve member, which resonance could otherwise result due to flow through the compression flow passage.

2. The improved shock absorber of claim 1 wherein flow through the compression flow passage biases the valve member toward the second position; and wherein application of electrical input to the solenoid coil subassembly biases the valve member toward the first position.

3. The improved shock absorber of claim 2 wherein a longitudinal axis is defined in the compression flow passage between the inlet end and the outlet end; and wherein the longitudinal axis of the compression fluid passage and the path of movement of the valve member are coaxial with the central longitudinal axis.

4. The improved shock absorber of claim 1 wherein a longitudinal axis is defined in the compression flow passage between the inlet end and the outlet end; wherein the longitudinal axis of the compression flow passage is substantially parallel with the central longitudinal axis; and wherein the inlet end of the compression flow passage is disposed at an angle of substantially 90 degrees with respect to the central longitudinal axis.

5. The improved shock absorber of claim 4 wherein the valve member moves between the first and second positions along a path substantially aligned with the longitudinal axis of compression flow passage.

6. The improved shock absorber of claim 5 wherein flow through the compression flow passage biases the valve member toward the second position; and wherein application of electrical input to the solenoid coil subassembly biases the valve member toward the first position.

* * * * *